April 8, 1952     H. H. CLAYTON, JR     2,591,676
EJECTOR COOLING SHROUD FOR USE ON THE EXHAUST
SYSTEMS OF TURBOJET AIRCRAFT ENGINES
Filed Dec. 17, 1948
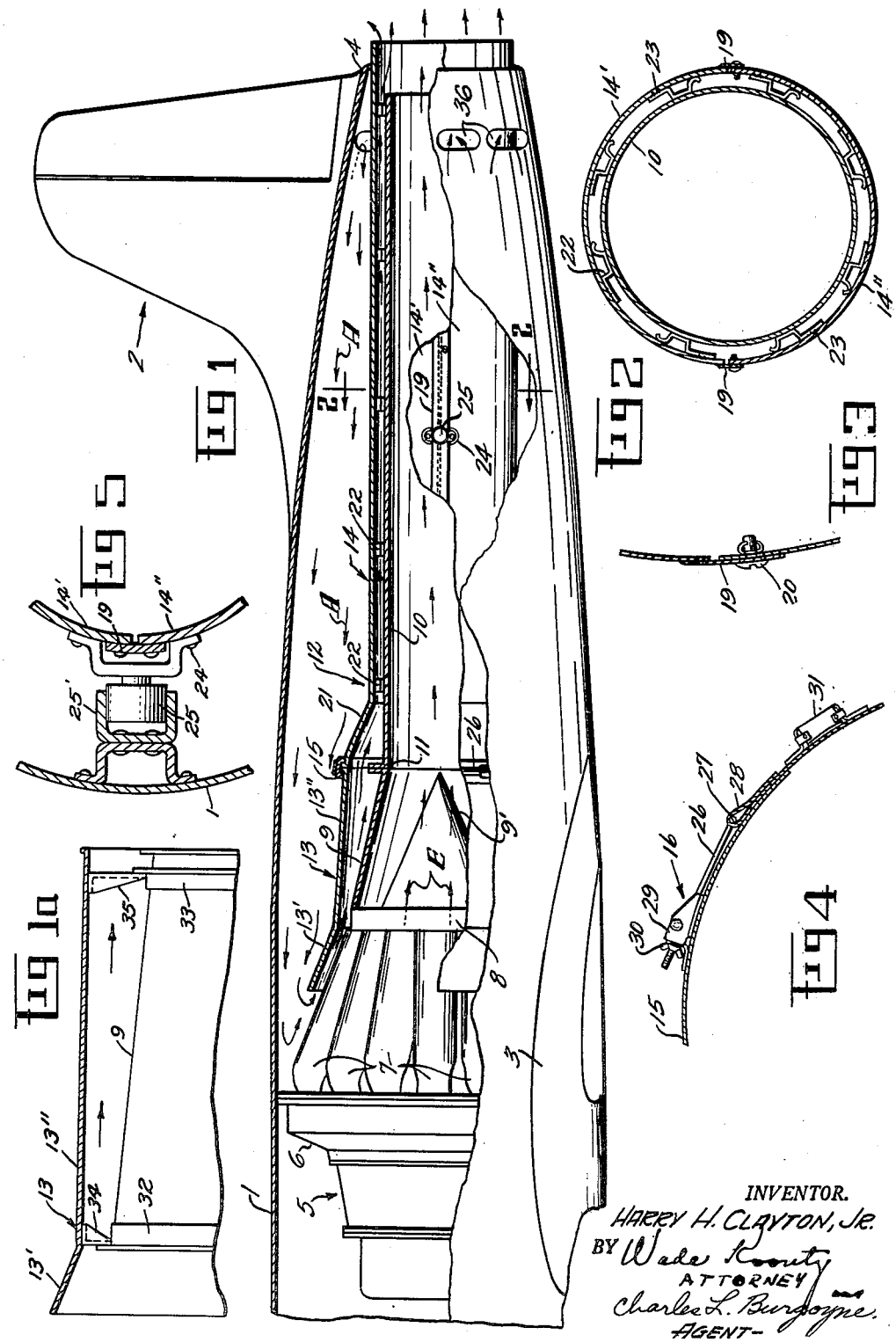
INVENTOR.
HARRY H. CLAYTON, JR.
BY Wade Koontz
ATTORNEY
Charles L. Burgoyne
AGENT—

Patented Apr. 8, 1952

2,591,676

UNITED STATES PATENT OFFICE 2,591,676

EJECTOR COOLING SHROUD FOR USE ON THE EXHAUST SYSTEMS OF TURBOJET AIRCRAFT ENGINES

Harry H. Clayton, Jr., Rosamond, Calif.

Application December 17, 1948, Serial No. 65,954

3 Claims. (Cl. 60—35.6)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to an ejector cooling shroud for use on the exhaust system of a turbo-jet aircraft engine.

The primary object of the invention is to provide an exhaust system for use on a turbo-jet aircraft engine incorporating a cooling shroud between the exhaust tail pipe and the aircraft fuselage wall with provision for air flow on both sides of the cooling shroud, so as to more effectively cool the shroud as well as the tail pipe.

Another object of the invention is to provide an exhaust system for use on a turbo-jet engine and including an engine exhaust tail pipe having a shroud pipe in closely spaced surrounding relation and all housed within an aircraft fuselage or other casing provided with cooling air inlet openings to admit air which may flow freely between the fuselage wall and the shroud pipe and thence between the shroud pipe and tail pipe for cooling said pipes and for eventual discharge into the free atmosphere by the ejector action of exhaust gases flowing through the tail pipe and into the atmosphere.

Another object of the invention is to provide an exhaust system for use on a turbo-jet aircraft engine wherein the engine exhaust tail pipe is surrounded by a shroud pipe having air flowing on the outside and inside thereof to more effectively cool the tail pipe and the shroud pipe and also to promote the evaporation and removal of any engine fuel which may escape from the tail pipe by leakage through the walls thereof or which may reach the spaces adjacent to the shroud pipe by any other path.

The above and other objects of the invention will become apparent upon reading the following detailed description in conjunction with the accompanying drawing, in which:

Fig. 1 is a longitudinal side view partly in section of an aircraft having a turbo-jet engine carried within the fuselage and with the forward portion of the aircraft omitted to conserve space on the drawing.

Fig. 1a is a fragmentary side view partly in section of the tail and shroud pipe assembly just aft of the engine.

Fig. 2 is a transverse cross sectional view of the tail and shroud pipe assembly taken on the line 2—2 of Fig. 1.

Fig. 3 is a fragmentary cross sectional view showing a fastening means which may be used to unite two semi-cylindrical shells forming the shroud pipe.

Fig. 4 is a fragmentary cross sectional view showing part of a clamping band which may be used in closing a gap between two adjoining sections of the shroud pipe.

Fig. 5 is a transverse sectional view taken through one of the shroud supporting rollers and guide track therefor.

For a detailed description of the present improved exhaust system reference is made to Fig. 1 of the drawing. The aft portion of the aircraft fuselage, indicated at 1, carries the usual vertical stabilizer and rudder assembly 2 and left hand wing assembly 3. The fuselage, which may also be termed a body section, is of generally circular cross section and tapers rearwardly toward the open rear end 4. The sheet metal fuselage shell is preferably reinforced with structural members extending longitudinally as well as circumferentially of the shell, but these parts are omitted to simplify the drawings. Supported on the structural members within the fuselage is a turbo-jet engine 5 which receives air from one or more air scoops located forwardly of the engine air compressor section 6. The compressed air from the compressor flows into the combustion chambers 7 to support combustion of a liquid fuel sprayed into the chambers near the left-hand ends thereof. The chambers 7 converge toward a gas turbine section 8, which furnishes power to drive the air compressor. The hot gases leaving the turbine pass into the exhaust cone section 9 and thence into the tail pipe 10, as indicated by arrows E. As customary the central portion of the space within the cone section 9 is filled by an exhaust cone 9'. The cone section 9 and tail pipe 10 are flanged outwardly at 11 to provide a joint which may be easily disconnected, it being understood that these mating flanges are held together by any convenient clamping means, such as bolts or a clamping ring having an annular recess internally thereof to receive the projecting flanges. The tail pipe 10 of conventional construction discharges the hot exhaust gases freely into the atmosphere rearwardly of the airplane, the thrust effort obtained being due to the large increase in the volume of gases caused by the heat of combustion generated in the engine. There is generally an excess of air taken into the engine over that required for complete combustion of the fuel, so that the exhaust gases include heated air as well as the products of combustion. Surrounding the tail pipe in closely spaced relation is a shroud pipe 12 the function of which is to protect the fuselage structure from heat radiated from the tail pipe, exhaust cone section and the hotter portions of the combustion chambers. This shroud pipe, or shroud, may conveniently be made of two main sections 13 and 14 joined end to end. The adjacent end portions of the sections 13 and 14 may be flanged outwardly and held together by means of a clamping band 15 provided with inwardly formed flanges, as shown in Fig. 1. The metallic band 15 is preferably held in place by a clamp 16, such as that shown in Fig. 4 and described in detail below.

The shroud section 13 located forwardly is of sheet steel construction welded to provide a unitary rigid structure and is secured to the exhaust cone section 9 by a plurality of brackets. The shroud section 13 comprises two united annular portions 13' and 13" which lie adjacent to the combustion chambers 7 and to the exhaust cone section 9 respectively. By reference to Fig. 1a it will be seen that the exhaust cone section 9 carries flanged rings 32 and 33 adjacent to the forward and rearward ends and secured to these rings are supporting brackets 34 and 35 secured at their outer ends to the tubular shroud portion 13". The rearwardly located shroud section 14 comprises two similar shells 14' and 14" extending all the way from the clamping band 15 to the aft end of the airplane. These shells are joined at their longitudinal edges by means of steel strips 19 welded to the upper shell 14' and secured to the lower shell 14" by means of bolts or fasteners 20. As shown in Fig. 3 these fasteners are of the quickly detachable type known by the name of Dzus fasteners. At the forward end of the shroud section 14 the upper and lower shells 14' and 14" include diverging wall portions 21 to carry the shroud outwardly beyond the flange formations 11 of the tail pipe and exhaust cone section. The shroud pipe, and particularly the aft section 14 thereof, is maintained in spaced relation with respect to the tail pipe by a series of circumferentially arranged spacers or "hat sections" 22. As seen in Fig. 1 these spacers may be located at five equally spaced stations and at each station there may be eight spacers (see Fig. 2). All of the spacer members are identical in size and shape and include a central U-shaped portion having oppositely extending leg portions integral therewith. One leg portion which is longer and flatter than the other is spot welded to the shroud at 23, while the other leg portion of convex formation is merely in contacting relation with respect to the shroud. The bight portion of each spacer is so positioned as to come into close contact with the tail pipe 10. Since the spacers 22 are attached to the shroud at only a single point, the remaining portions thereof are free to expand and contract longitudinally as they are heated and cooled. Furthermore upon expansion of the tail pipe circumferentially there will be a tendency for the spacers to be flattened out slightly but this will not cause any permanent deformation of the spacers since they are made of strip steel having considerable resiliency or springiness. At about the mid-point lengthwise of the joint strips 19 there are provided a pair of diametrically opposite shroud pipe supports 24, which carry outwardly projecting roller elements 25 adapted to be supported on a pair of short track elements 25' mounted inside of the fuselage structure (see Fig. 5). As the shroud pipe expands and contracts the rollers will be free to assume new positions without any interference. As may be seen in Fig. 1 the shroud pipe projects beyond the open rear end 4 of the fuselage and substantially beyond the end of the tail pipe 10. The shroud pipe sections as well as the tail pipe itself are preferably made of a steel which is resistant to oxidation at elevated temperatures. For instance various grades and types of stainless steel are very satisfactory for this purpose.

The clamping band 15 for closing the slight gap between the shroud sections 13 and 14 comprises a strip of steel wrapped around the structure and held in tightened relation by one or more clamps 16 as shown in Fig. 4. The clamp 16 includes a threaded rod 26 provided with a loop 27 within which is received a loop 28 integral with the band 15. The rod 26 extends into a housing 29 secured to the clamping band and the housing 29 includes a wall or abutment at one end to provide a surface against which the wing nut 30 may engage to hold the clamping band in closed relation, to form an encircling hoop or band tightly engaging both the shroud section 13 and the shroud section 14. The band 15 is provided with peripheral flanges at the opposite sides thereof which flanges extend inwardly to engage other flanges extending outwardly from the adjacent ends of shroud sections 13 and 14. Thus the rear shroud section 14, comprising similar shells 14' and 14", is held against rearward sliding movement with respect to the front shroud section 13 and with respect to the tail pipe 10. The band 15 is also provided with a box 31 covering a handle member required in applying and tightening the clamping band. The wing nut 30 is preferably held against rotation by a wire fixing or any other suitable device.

The fuselage wall is provided near the rear end 4 with a plurality of circumferentially arranged air inlet openings 36 to admit cooling air into the space between the fuselage wall and the exhaust pipe shroud. This air is free to flow forwardly along the outer side of the shroud in the direction of the arrows A and thence into the space between the shroud and the combustion chambers 7. The air continues through the annular space between the shroud and the exhaust cone section and then into the space between the shroud and the tail pipe 10 leading to the outside atmosphere. This continuous air flow is maintained by the ejector action of the exhaust gases flowing from the tail pipe 10 and through a short end portion of the shroud pipe. In passing the annular opening between the tail pipe and the shroud the high velocity gas flow produces an aspirating action in accordance with the principles of Bernoulli's Theorem. This aspirating action, similar to that produced in the well-known diffusion pump, tends to produce a vacuum in the annular space between the tail pipe and shroud pipe, so that air flowing in to occupy the partially evacuated space maintains steady air flow in the cooling circuit described above.

The use of cooling air in motion on both sides of the shroud results in a lower average temperature in the sheet metal of the shroud, so that there will be less expansion as the metal heats up to running temperature and also less tendency for surface oxidation while operating the engine. Furthermore the counterflow cooling action described prevents any marked temperature difference from one side to the other of the shroud wall and therefore results in a minimum of internal stresses in the shroud material and a longer life of the equipment. In addition the forward flow of cooling air between the shroud and the fuselage wall will prevent any serious heating of the aircraft or airframes.

A further important advantage inherent in the exhaust system disclosed is the reduction in fire hazard, due to the fact that the shroud provides extra protection against leakage of liquid fuel from the tail pipe onto the fuselage wall. On starting the engine raw fuel is apt to find its way past the turbine and into the tail pipe and if the tail pipe is not entirely fluid-tight the unburned fuel may drip through and reach the fuselage structure. Moreover in the present system if fuel should leak through both pipes, then the circulation of air in the space between the fuselage wall and the shroud will promote evaporation of the fuel. The starting fuel being gasoline, evaporation will proceed rapidly after the engine is started and the danger of fire during starting will be reduced very materially. It is further emphasized that the shroud pipe and the circulation of air therealong will prevent possible accumulation of exhaust gases in the space between the engine and the fuselage wall if the tail pipe should develop leaks at any point. Also the shroud pipe will act as light armor plate in protecting the tail pipe against battle damage where the exhaust system is used on combat aircraft. Even if the fuselage, shroud and tail pipe are successively punctured by projectiles of small caliber, then the continued circulation of cooling air in the manner described above will prevent hot exhaust gases from reaching the fuselage structure in any great volume.

It should be further emphasized that the flow of cooling air in the circuit as described above will actually cause liquid fuel to be drawn along the path of the cooling air and thus reach the outside by discharge with the cooling air. Thus regardless of how the fuel reaches the spaces on either side of the shroud pipe walls, the cooling air by its rapid flow will entrain the fuel and carry it away for discharge from the rear end of the shroud pipe. This effect takes place either with starting fuel such as gasoline, or with normal operating fuel such as kerosene. Evaporative removal always occurs but the most rapid removal of a given quantity of fuel is effected by the direct action of the stream of rapidly moving cooling air. While one possible source of raw fuel in the tail pipe is by way of the normal fuel flow into the combustion chambers of the engine, there are other more devious paths by which raw fuel may reach the spaces near or around the exhaust pipe. For instance fuel may sometimes flow along the outside of the fuselage from a broken fuel line and then enter the interior of the fuselage through a seam or joint. There may also be fuel leaks within the fuselage from defective piping or punctured fuel tanks. The present ejector cooling shroud not only provides no place for the pocketing of liquid fuel but by its action as described above rapidly clears the exhaust system of unwanted fuel, the presence of which constitutes a serious fire hazard.

It should be noted that even though the present exhaust system is shown in connection with an engine mounted within an aircraft fuselage, it is also adapted for use on engines located in outboard nacelle structures or in any other suitable hollow body structure forming part of the aircraft.

The embodiments of the invention herein shown and described are to be regarded as illustrative only and it is to be understood that the invention is susceptible to variations, modifications and changes within the scope of the appended claims.

I claim:

1. In a jet-propelled aircraft, an elongated hollow body section extending in a fore-and-aft direction to enclose a turbo-jet engine and having its aft end open, means including said engine for closing the body section at a point adjacent to its forward end, an exhaust pipe extending from said engine centrally of said body section and opening into the atmosphere through the open aft end of said body section, a shroud pipe surrounding said exhaust pipe and spaced therefrom to provide an annular air space for the passage of cooling air, means providing a plurality of circumferentially arranged air inlet openings in the wall of said hollow body section adjacent to the aft end thereof, said shroud pipe extending beyond the aft end of said exhaust pipe whereby the flow of exhaust gases from said exhaust pipe effects an ejector action on air in said annular air space to cause continuous flow of cooling air from the atmosphere through said air inlet openings, thence forwardly between the wall of said body section and said shroud pipe and thence rearwardly between said shroud pipe and said exhaust pipe.

2. In a jet-propelled aircraft, an elongated hollow body section extending in a fore-and-aft direction to enclose a turbo-jet engine and having its aft end open, means including said engine for closing the body section at a point adjacent to its forward end, said engine including a series of combustion chambers extending generally fore-and-aft and arranged around said engine toward the rearward end thereof, an exhaust pipe to receive exhaust gases from said combustion chambers and extending from said engine centrally of said body section and opening into the atmosphere through the open aft end of said body section, a shroud pipe surrounding portions of said combustion chambers and completely surrounding said exhaust pipe and being spaced therefrom to provide an annular air space for the passage of cooling air, means providing a plurality of circumferentially arranged air inlet openings in the wall of said hollow body section adjacent to the aft end thereof, said shroud pipe extending beyond the aft end of said exhaust pipe whereby the flow of exhaust gases from said exhaust pipe effects an ejector action on air in said annular air space to cause continuous flow of cooling air from the atmosphere through said air inlet openings, thence forwardly between the wall of said body section and said shroud pipe and thence rearwardly between said shroud pipe and said combustion chambers and between said shroud pipe and said exhaust pipe.

3. In a jet-propelled aircraft, an elongated hollow body section extending in a fore-and-aft direction to enclose a turbo-jet engine and having its aft end open, means including said engine for closing the body section at a point adjacent to its forward end, an exhaust pipe extending from said engine centrally of said body section and opening into the atmosphere through the open aft end of said body section, a shroud pipe surrounding said exhaust pipe throughout the length of said exhaust pipe and spaced therefrom to provide an annular air space for the passage of cooling air, said body section being of decreasing diameter from a point near the forward end of said shroud pipe and terminating in a shroud pipe abutting end portion of minimum diameter, means providing a plurality of circumferentially arranged air inlet openings in the wall of said hollow body section adjacent to said shroud pipe abutting end portion thereof, said shroud pipe extending beyond the aft end of said exhaust pipe whereby the flow of exhaust gases from said exhaust pipe effects an ejector action on air in said annular air space to cause continuous flow of cooling air from the atmosphere through said air inlet openings, thence forwardly between the wall of said body section and said shroud pipe and thence rearwardly between said shroud pipe and said exhaust pipe.

HARRY H. CLAYTON, Jr.

REFERENCES CITED

The following references are of record in the file of this patent:

UNITED STATES PATENTS

| Number | Name | Date |
| --- | --- | --- |
| 1,079,758 | Gray | Nov. 25, 1913 |
| 1,966,620 | Fluor | July 17, 1934 |
| 2,121,319 | Fluor et al. | June 21, 1938 |
| 2,397,999 | Goddard | Apr. 9, 1946 |

FOREIGN PATENTS

| Number | Country | Date |
| --- | --- | --- |
| 577,949 | Great Britain | June 6, 1946 |
| 584,169 | Great Britain | Jan. 8, 1947 |